United States Patent
Ku et al.

(10) Patent No.: US 7,304,835 B2
(45) Date of Patent: Dec. 4, 2007

(54) MAINFRAME AND POWER SUPPLY ARRANGEMENT

(75) Inventors: Kang Ku, Taipei (TW); Hsien-Tang Liu, Taipei (TW); Chia-Yen Hsu, Taipei (TW)

(73) Assignee: Datavan International Corp., Taipei Hsien (TW)

( * ) Notice: Subject to any disclaimer, the term of this patent is extended or adjusted under 35 U.S.C. 154(b) by 420 days.

(21) Appl. No.: 10/908,153

(22) Filed: Apr. 28, 2005

(65) Prior Publication Data
US 2006/0245149 A1 Nov. 2, 2006

(51) Int. Cl.
*H05K 7/00* (2006.01)
*H02B 1/00* (2006.01)
*H02J 3/36* (2006.01)
*H02M 1/10* (2006.01)
*H02P 27/00* (2006.01)

(52) U.S. Cl. .................. 361/679; 318/722; 361/601; 363/35; 363/142

(58) Field of Classification Search ................ 361/601, 361/679; 363/35, 142; 318/722
See application file for complete search history.

(56) References Cited

U.S. PATENT DOCUMENTS

| | | | |
|---|---|---|---|
| 5,121,296 A * | 6/1992 | Hsu .......................... 361/685 |
| 6,392,317 B1 | 5/2002 | Hall et al. |
| 6,670,880 B1 | 12/2003 | Hall et al. |
| 6,717,501 B2 | 4/2004 | Hall et al. |
| 6,735,078 B2 * | 5/2004 | Tsai .......................... 361/695 |
| 6,799,632 B2 | 10/2004 | Hall et al. |
| 6,821,147 B1 | 11/2004 | Hall et al. |
| 6,830,467 B2 | 12/2004 | Hall et al. |
| 6,844,498 B2 | 1/2005 | Hall et al. |
| 6,888,473 B1 | 5/2005 | Hall et al. |
| 6,919,039 B2 | 7/2005 | Hall et al. |
| 6,929,493 B2 | 8/2005 | Hall et al. |
| 6,945,802 B2 | 9/2005 | Hall et al. |
| 2002/0199048 A1 * | 12/2002 | Rabinovitz ................. 710/100 |
| 2003/0067224 A1 * | 4/2003 | Tai ............................ 307/117 |
| 2004/0027803 A1 * | 2/2004 | Tsai ........................... 361/695 |
| 2005/0001735 A1 | 1/2005 | Hall et al. |
| 2005/0115717 A1 | 6/2005 | Hall et al. |
| 2005/0122675 A1 * | 6/2005 | Cheng ........................ 361/685 |
| 2005/0145408 A1 | 7/2005 | Hall et al. |
| 2005/0150853 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236150 A1 | 10/2005 | Hall et al. |
| 2006/0041783 A1 * | 2/2006 | Rabinovitz .................... 714/6 |
| 2006/0243472 A1 * | 11/2006 | Ku et al. ...................... 174/50 |

\* cited by examiner

*Primary Examiner*—Jayprakash Gandhi
*Assistant Examiner*—Anthony M Haughton

(57) ABSTRACT

A mainframe and power supply arrangement is disclosed to include a mainframe, which has a base frame holding a DC power jack and connector modules, a circuit module, which includes a sliding carrier detachably slidably inserted into the base frame and a circuit board carried on the sliding carrier and having connectors connectable to respective connecting portions of the connector module and a electric power distribution module for distribution of DC power supply received to the DC power jack, and an external power supply unit set outside the mainframe and connectable to the DC power jack for converting AC power supply into DC power supply and providing converted DC power supply to the electric power distribution module.

5 Claims, 4 Drawing Sheets

MAINFRAME AND POWER SUPPLY ARRANGEMENT

BACKGROUND OF THE INVENTION

1. Field of the Invention

The present invention relates computers and more particularly, to a mainframe and power supply arrangement, which has the power supply unit provided outside the mainframe so that the heat produced by the power supply unit during working does not affect the internal parts of the mainframe.

2. Description of the Related Art

Due to fast processing speed and the use of versatile circuit modules, advanced computers consume much electric energy. In order to improve the output power of a power supply unit to meet the power consumption requirement of an advanced computer, the capacity of the internal current rectifying circuit assembly of the power supply unit must be relatively increased. However, a high-capacity current rectifying circuit assembly produces much heat during its operation. In order to maintain the working temperature of the mainframe of a computer or the like within a predetermined optimum range, a heat dissipating device, for example, a fan shall be used. However, a fan may cause a turbulent flow of air inside the power supply unit, or produce low-frequency noises. Further, because the power supply unit of a computer is mounted inside the mainframe, the action of converting AC power supply into DC power supply may affect the circuit module of the mainframe.

Therefore, it is desirable to provide a mainframe and power supply arrangement that eliminates the aforesaid problems.

SUMMARY OF THE INVENTION

The present invention has been accomplished under the circumstances in view. According to one aspect of the present invention, the mainframe and power supply arrangement comprises a mainframe, a circuit module mounted inside the mainframe, and a power supply unit provided outside the mainframe and adapted to convert AC power supply into DC power supply for the working of the internal parts of the mainframe. According to another aspect of the present, the mainframe comprises two sliding grooves arranged in parallel at two side panels at two sides of the base frame thereof. The circuit module comprises a sliding carrier, which has two sliding rails insertable into the sliding grooves at the side panels of the mainframe, and a circuit board carried on the sliding carrier. The circuit board has connectors connectable to the connecting portions of the connector modules in the mainframe. Because the circuit board is carried on the sliding carrier, mounting/dismounting the circuit module does not damage the circuit board accidentally.

DETAILED DESCRIPTION OF THE PREFERRED EMBODIMENT

Figure 1:
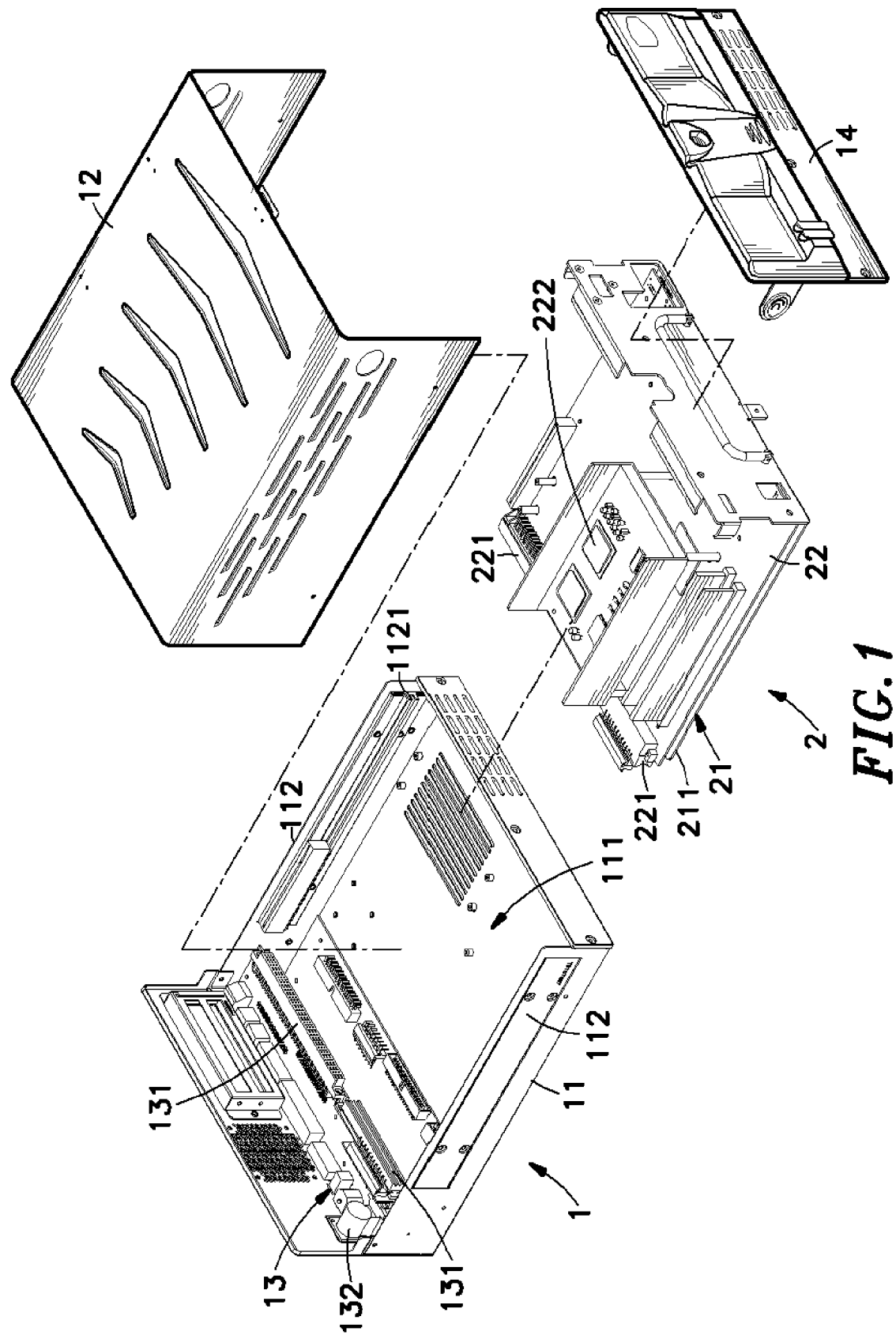
FIG. 1 is an exploded view of a mainframe and power supply arrangement according to the present invention.
Figure 2:
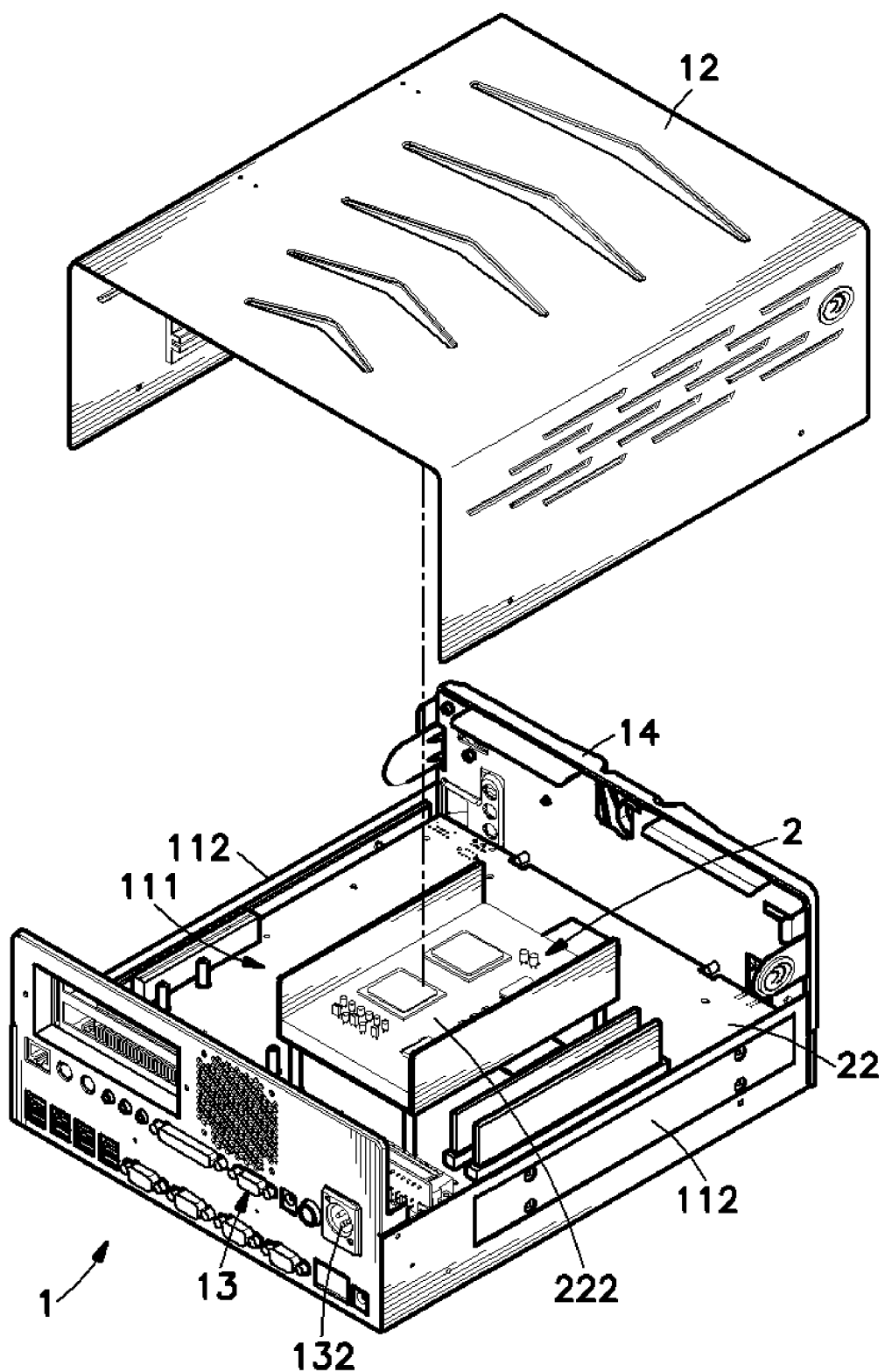
FIG. 2 is an assembly view of the mainframe and the circuit module according to the present invention.
Figure 3:
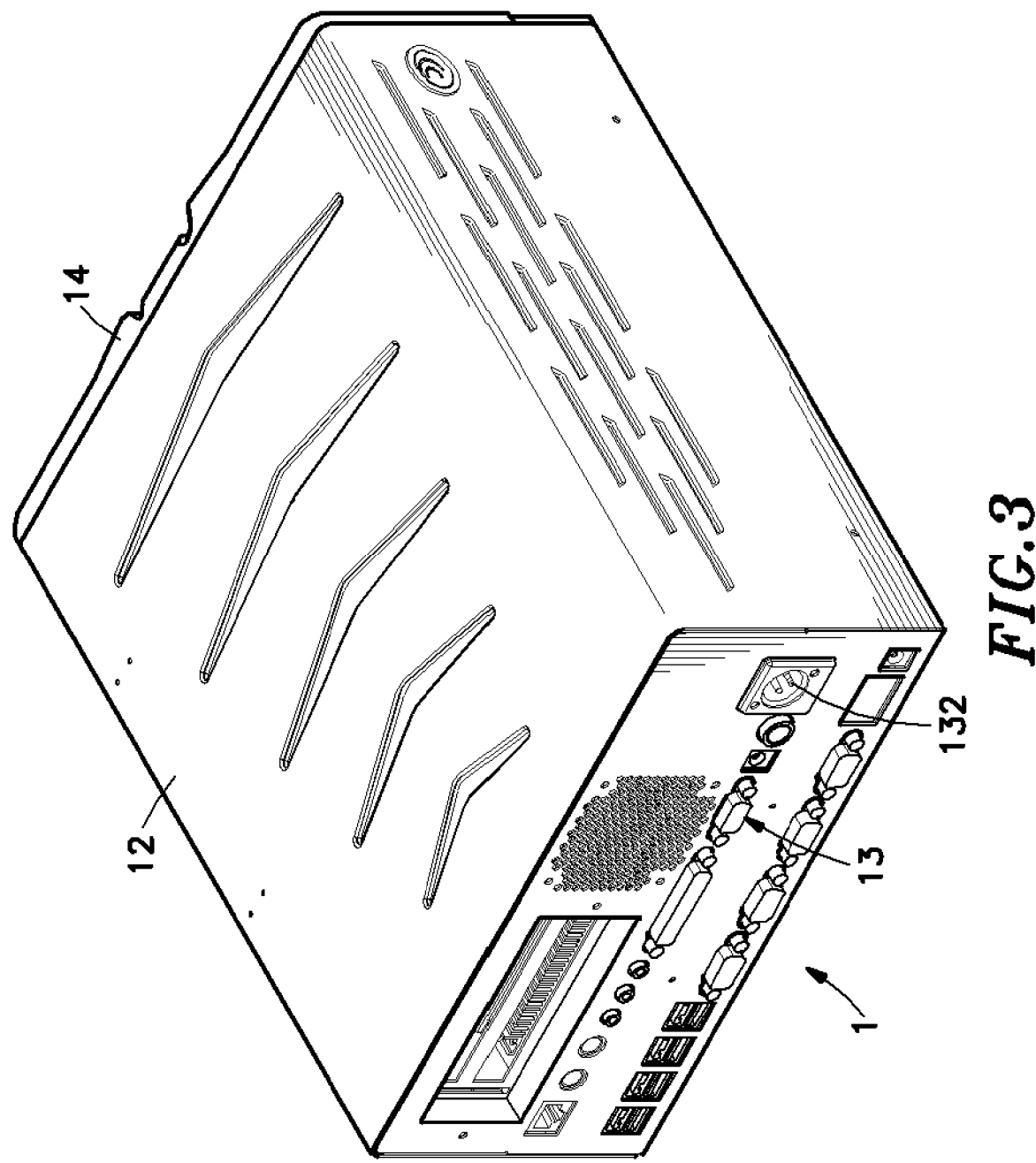
FIG. 3 illustrates the outer appearance of the present invention (the power supply unit excluded).
Figure 4:
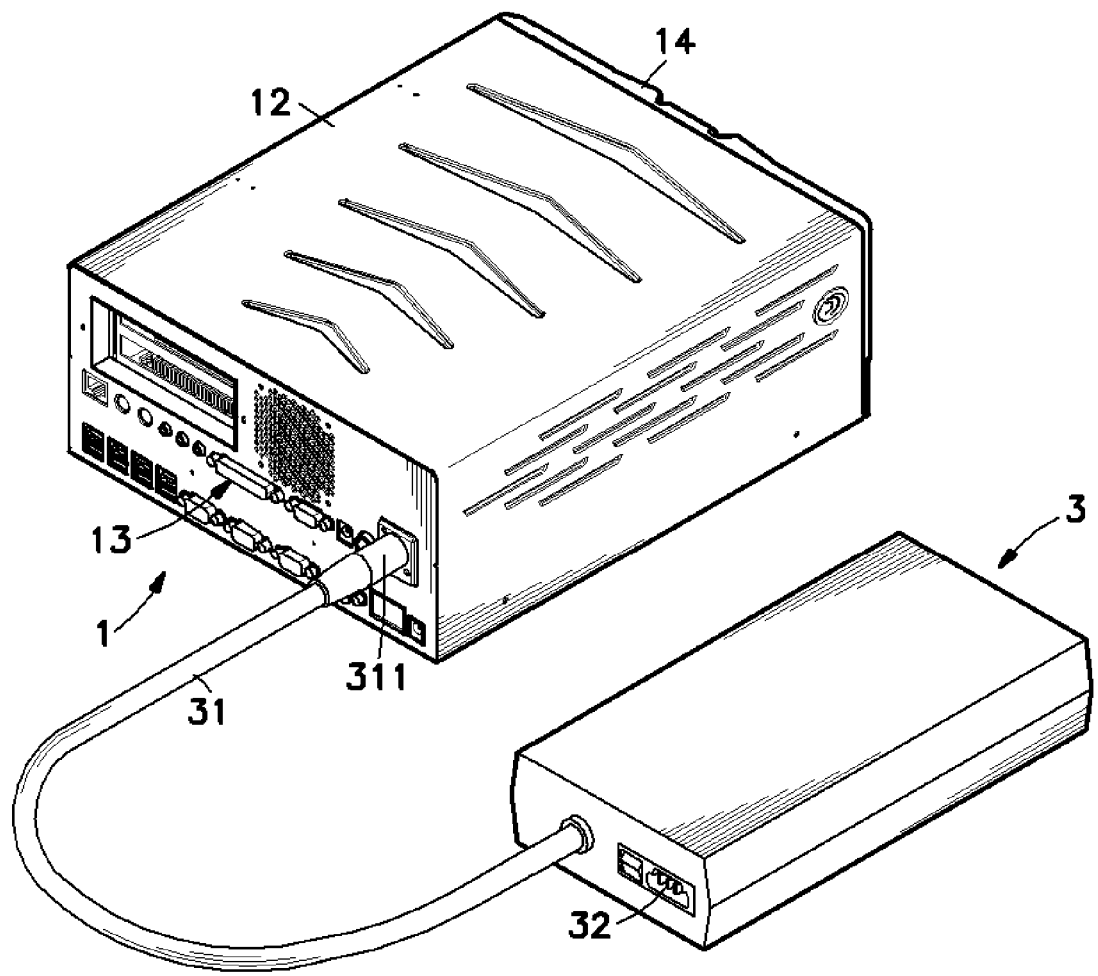
FIG. 4 illustrates the outer appearance of the present invention (the power supply unit included).

Referring to FIGS. 1~4, a mainframe and power supply arrangement in accordance with the present invention is shown comprised of a mainframe 1, a circuit module 2, and a power supply unit 3.

The mainframe 1 is comprised of a base frame 11, a top cover 12, connector modules 13, and a side cover 14. The base frame 11 defines therein an accommodating chamber 111, having two side panels 112 arranged in parallel at two opposite lateral sides. The side panels 112 are respectively extruded from aluminum, each having a sliding groove 1121 extending along the length. The top cover 12 covers the base frame 11 over the accommodating chamber 111. The connector modules 13 are mounted in the base frame 11 near one side, each having a connecting portion 131 positioned in the accommodating chamber 111 and a DC power jack 132 extended to the outside of the mainframe 1. The side cover 14 is covered on one side of the base frame 11 between the two side panels 112 remote from the connector modules 13.

The circuit module 2 comprises a sliding carrier 21, which has two sliding rails 211 symmetrically disposed at two opposite lateral sides thereof and respectively insertable into the sliding grooves 1121 at the side panels 112, and a circuit board 22 detachably mounted on the sliding carrier 21. The circuit board 22 comprises a plurality of connectors 221 respectively electrically connectable to the connecting portions 131 of the connector modules 13, and an electric power distribution module 222.

During assembly process, the side cover 14 is detached from the base frame 11, and then the circuit module 2 is inserted into the sliding grooves 1121 at the side panels 112 of the base frame 11 to force the connectors 221 into connection with the connecting portions 131 of the connector modules 13 respectively, and then the side cover 14 is fastened to the base frame 11 again.

Referring to FIG. 4 and FIGS. 1~3 again, the power supply unit 3 is shown having a cable 31 and an AC power jack 32. The cable 31 has the end terminating in a DC plug 311 connectable to the DC power jack 132 of the mainframe 1 to provide DC power supply to the connector module 13 and the electric power distribution module 222 of the circuit module 2. Because the power supply unit 3 is provided outside the mainframe 1, heat produced by the power supply unit 3 during its operation does not affect the internal component parts of the mainframe 1.

As indicated above, the invention has the following features.

1. The mainframe 1 has an electric power distribution module 222 to distribute DC power supply received from the external power supply unit 3 that is provided outside the mainframe 1 to convert AC power supply into DC power supply for the working of the internal parts of the mainframe 1. Therefore, the internal parts of the mainframe 1 are free from the influence of the heat produced by the power supply unit 3.

2. By means of inserting the sliding rails 211 of the sliding carrier 21 of the circuit module 2 into the sliding grooves 1121 at the side panels 112 of the base frame 11, the circuit module 2 can smoothly be moved in and out of the mainframe 1, and mounting/dismounting the circuit module 2 does not cause damage to the circuit board 22 accidentally.

Although a particular embodiment of the invention has been described in detail for purposes of illustration, various modifications and enhancements may be made without departing from the spirit and scope of the invention.

What is claimed is:

1. A mainframe and power supply arrangement comprising a mainframe, a circuit module, and a power supply unit, wherein:

said mainframe comprises a base frame, an accommodating chamber defined in said base frame, two side panels at two opposite lateral sides of said accommodating chamber, two sliding grooves respectively formed at said side panels and facing said accommodating chamber, a DC power jack mounted in said base frame and extended to the outside of said mainframe, and a plurality of connector modules mounted in said base frame and electrically connected to said DC power jack, said connector modules each having a connecting portion positioned in said accommodating chamber;

said circuit module is detachably mounted in said mainframe, comprising a sliding carrier insertable into said accommodating chamber, said sliding carrier comprising two sliding rails symmetrically disposed at two opposite lateral sides thereof and respectively insertable into the sliding grooves at said side panels of said mainframe, and a circuit board detachably mounted on said sliding carrier, said circuit board comprising a plurality of connectors respectively electrically connectable to the connecting portions of said connector module, and a electric power distribution module for receiving DC power supply from said DC power jack through said connector modules;

said power supply unit is provided outside said mainframe and electrically connectable to said DC power jack and adapted to convert AC power supply into DC power supply for said electric power distribution module.

2. The mainframe and power supply arrangement as claimed in claim 1, wherein said mainframe further comprises a top cover covered on said base frame over said accommodating chamber.

3. The mainframe and power supply arrangement as claimed in claim 1, wherein said mainframe further comprises a side cover fastened to said base frame at one side.

4. The mainframe and power supply arrangement as claimed in claim 1, wherein said side panels of said mainframe are respectively extruded from aluminum.

5. The mainframe and power supply arrangement as claimed in claim 1, wherein said power supply unit comprises a cable for DC output, said cable having a DC plug disposed at one end thereof and connectable to said DC power jack.

* * * * *